United States Patent [19]

Taguchi

[11] Patent Number: 4,620,465
[45] Date of Patent: Nov. 4, 1986

[54] APPARATUS FOR CONTROLLING CUTTING MACHINES

[75] Inventor: Masayuki Taguchi, Hatano, Japan

[73] Assignee: Amada Company, Limited, Japan

[21] Appl. No.: 607,259

[22] Filed: May 4, 1984

[30] Foreign Application Priority Data

May 6, 1983 [JP] Japan .................................. 58-78205

[51] Int. Cl.⁴ .......................................... B23D 55/06
[52] U.S. Cl. ........................................ 83/74; 83/311; 83/800; 83/801
[58] Field of Search .................. 83/74, 801, 311, 800, 83/72

[56] References Cited

U.S. PATENT DOCUMENTS 1,997,608  4/1935  Swift ................................ 83/311 X
4,357,848  11/1982  Sakurai et al. ........................ 83/801

*Primary Examiner*—Donald R. Schran
*Attorney, Agent, or Firm*—Wigman & Cohen

[57] ABSTRACT

A cutting machine has a plurality of switches, each switch corresponding to a predetermined cutting speed for each of one of the various groups of materials to be cut, the materials having different machinablility qualities. One of a plurality of constant voltage output means are connected with one of each of the plurality of switches for changing the speed of the cutting tool responsive to the constant voltage output means.

8 Claims, 4 Drawing Figures

APPARATUS FOR CONTROLLING CUTTING MACHINES

BACKGROUND OF THE INVENTION

1. Field of the Invention

The present invention relates generally to cutting machines such as bandsaw machines, hacksawing machines, circular sawing machines and abrasive cutting machines and, more particularly, pertains to a method and apparatus for controlling cutting machines.

2. Description of the Prior Art

The prior art concerning the present invention will be described, by way of example, in relation to what is called a horizontal bandsaw machine, although the present invention is applicable to a variety of cutting machines such as hacksawing machines, circular sawing machines and abrasive cutting machines.

As is well known, horizontal bandsaw machines comprise a base on which a workpiece or workpieces to be cut are to be placed and clamped and a cutting head assembly in which a flexible endless bandsaw blade is trained around a pair of wheels or pulleys, one of which is power driven to drive the bandsaw blade. In the cutting head assembly, the bandsaw blade is slidably held and guided with its cutting edge faced perpendicularly downwardly by a pair of guide means at the cutting zone where cutting is performed so that it may cut into the workpiece to be cut. The cutting head assembly is so arranged as to be raised away from and lowered toward the base by a suitable means such as a hydraulic motor around a hinge pin or along one or more vertically disposed guide means. Thus, in each cutting cycle, the cutting head assembly is firstly raised and then lowered towards the base so as to enable the bandsaw blade being driven therein around the wheels to cut the workpiece which has been placed and clamped on the base.

In the horizontal bandsaw machines of the above described construction, it is desired that the bandsaw blade be adjustably fed into the workpiece to be cut at a higher or lower feeding speed and be adjustably driven at a higher or lower cutting or driven speed depending upon the nature and size of the workpiece. Stated more particularly, it is necessary that the bandsaw blade be fed at lower feeding and cutting speeds when cutting difficult-to-cut workpieces which are generally hard and tough. Also, it is necessary that the bandsaw blade be fed at higher feeding and cutting speeds when cutting normal easy-to-cut workpieces which are generally soft and brittle so as to obtain the desired cutting rate. Furthermore, it is necessary that the bandsaw blade be fed at a lower feeding speed to cut long cross-sectional lengths of the workpieces and be fed at a higher feeding speed to cut short cross-sectional lengths of the workpieces even though the workpieces may be the same nature or type of material.

Unless the feeding speed and the cutting speed of the bandsaw blade are correctly adjusted according to the nature and size of the workpieces to be cut, the cutting rate will be decreased and the life of the bandsaw blade will be shortened. The bandsaw blade will be often deflected or deviated from its normal cutting course when it is fed into the workpiece to be cut at an excessive feeding speed. Also, the bandsaw blade will become prematurely worn and be chipped when it is fed into the workpiece to be cut at an excessive cutting speed. On the other hand, the cutting rate will be decreased when the bandsaw blade is fed into the workpiece to be cut at much lower feeding or cutting speeds. Also, when the bandsaw blade is not fed at adequate feeding or cutting speeds when cutting difficult-to-cut workpieces which are generally hard and tough and mostly subject to work hardening, it will be unable to cut into the workpieces and will slide on the same only to scratch them without performing any cutting action with a result that a hard layer will be produced in kerves of the workpieces because of work hardening.

In order to perform cutting operations at a higher cutting rate with a longer life of the bandsaw blade, it is necessary to feed the bandsaw blade adjustably into the workpiece at adequate feeding and cutting speeds according to the nature and the cross-sectional length of the workpiece. In conventional bandsaw machines, however, it has been customary that the feeding and cutting speeds of the bandsaw blade are manually adjusted by the operator according to prescribed recommended cutting conditions and from his experience. Accordingly, it has been heretofore very troublesome and difficult to select and adjust the feeding and cutting speeds of the bandsaw blade for optimum cutting operations.

SUMMARY OF THE INVENTION

It is an object of the present invention to provide a method and apparatus for automatically controlling the cutting speed in cutting machines according to the nature of the workpieces to be cut.

It is another object of the present invention to provide a method and apparatus for automatically controlling cutting machines so that a cutting action will be started after an optimum cutting speed has been automatically set according to the nature of the workpiece to be cut.

It is still another object of the present invention to provide an apparatus for automatically controlling the cutting speed according to the nature or type of material of the workpieces to be cut and also automatically controlling the feeding speed according to the size of the workpieces in cutting machines.

In order to accomplish these objects, a cutting machine according to the present invention is so arranged that a speed changing means will steplessly vary the cutting speed according to the machinability of workpieces to be cut which have been classified into a plurality of groups. The cutting machine is also so arranged that a cutting cycle is sure to begin after the cutting speed has been determined.

Other and further objects and advantages of the present invention will be apparent from the following description and accompaning drawings which, by way of illustration, show a preferred embodiment of the present invention and the principle thereof.

DESCRIPTION OF THE PREFERRED EMBODIMENTS

Figure 1:
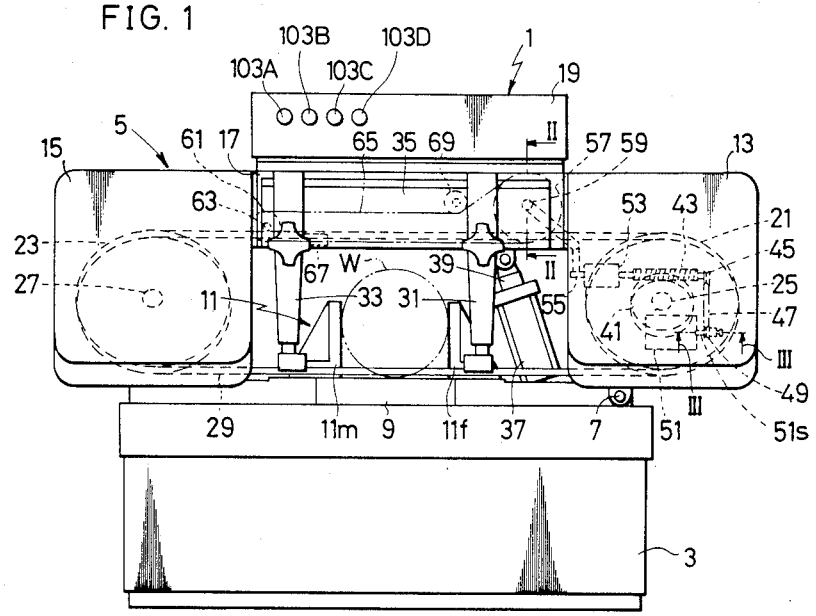
FIG. 1 is a front elevational view of a horizontal bandsaw machine embodying the principles of the present invention.

Referring now to FIG. 1, the present invention will be described as embodied in a horizontal bandsaw machine which is generally designated by the numeral 1. However, it is initially to be noted that the present invention is applicable to any suitable type of cutting machines such as hacksawing machines and circular sawing machines.

The horizontal bandsaw machine 1 comprises a box-like base 3 and a cutting head assembly 5 which is pivotally connected to the base 3 by means of a hinge pin 7 to be movable up and down toward and away from the same. The base 3 is provided at its top with a work-table 9 on which a workpiece W to be cut can be placed, and the work-table 9 is provided with a vise assembly 11 which has a fixed jaw 11f and a movable jaw 11m to clamp the workpiece W therebetween. The cutting head assembly 5 has spaced housing sections 13 and 15 connected with each other by a beam member 17 and is provided at its top with a control box 19. In the cutting head assembly 5, a pair of a driving wheel 21 and a driven wheel 23 having shafts 25 and 27, are enclosed in the housing sections 13 and 15, respectively, and a flexible endless bandsaw blade 29 is trained therearound so that it may be driven to make a cutting action when the driving wheel 21 is power driven. The bandsaw blade 29 is slidably held or guided with its cutting edge faced perpendicularly downwardly by a pair of a fixed guide assembly 31 and a movable guide assembly 33 so that a cutting stretch may be provided therebetween at the cutting zone of the horizontal bandsaw machine 1. The fixed and movable guide assemblies 31 and 33 are mounted on a guide way 35 which is fixed to the beam member 17 in a manner such that they depend therefrom in parallel with each other. The fixed guide assembly 31 is fixedly mounted on the guide way 35, while the movable guide assembly 33 is so mounted that it may be fixed on the guide way 35 in operation but may be moved toward and away from the fixed guide assembly 31 to adjust the cutting stretch of the bandsaw blade 29 according to the size of the workpiece W to be cut. Also, the cutting head assembly 5 of the above described construction is so arranged as to be swung up and down around the hinge pin 7 by a hydraulic motor 37 of a cylinder type having a piston rod 39 to feed and return the bandsaw blade 29 into and away from the workpiece W to be cut. Thus, the cutting head assembly 5 will be raised when the hydraulic motor 37 is supplied with the hydraulic fluid, and it will be lowered by its own gravity when the hydraulic fluid is drained from the hydraulic motor 37.

Referring again to FIG. 1, a worm wheel 41 is integrally mounted on the driving shaft 25 of the driving wheel 21, and a worm gear 43 is freely rotatably provided on the back of the housing section 13 of the cutting head assembly 5 in engagement with the worm wheel 41. Thus, when the worm gear 43 is driven in a manner to be described hereinafter, the worm wheel 41 will be driven to rotate the driving shaft 25 to enable the driving wheel 21 to drive the bandsaw blade 29.

Figure 3:
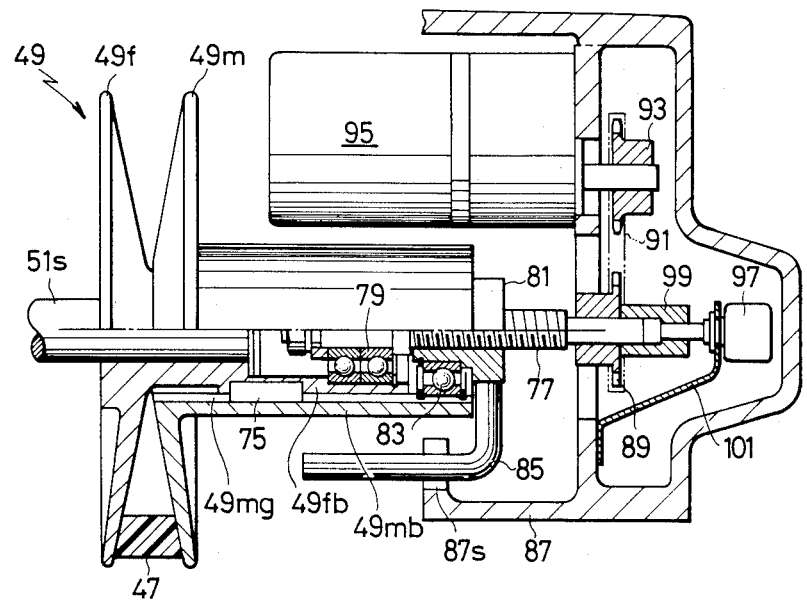
FIG. 3 is a sectional view taken along the line III—III of FIG. 1.

The worm gear 43 is connected at one of its ends to a driven cone pulley 45 which is mounted on the backside of the cutting head assembly 5, and the driven cone pulley 45 is connected by a V-belt 47 to a driving cone pulley 49 which is fixed to an output shaft 51s of an electric motor 51 as shown in FIGS. 1 and 3. As shown in FIG. 3, the driving cone pulley 49 consists of a pair of a fixed cone 49f and a movable cone 49m in the conventional manner, and the driven cone pulley 45 is also of the same construction in this respect although it is not shown in detail. As is conventional, the driven and driving cone pulleys 45 and 49 are so arranged as to steplessly change the rotation of the worm gear 43 to enable the driving wheel 21 to drive the bandsaw blade 29 at variable speeds. Also, the electric motor 51 is mounted on the backside of the cutting head assembly 5 in connection with the driving cone pulley 49. Thus, when the electric motor 51 is in motion, the worm gear 43 will be rotated at variable speeds by means of the driving and driven cone pulleys 49 and 45 to enable the driving wheel 21 to drive the bandsaw blade 29 through the worm wheel 41 at variable speeds.

Figure 2:
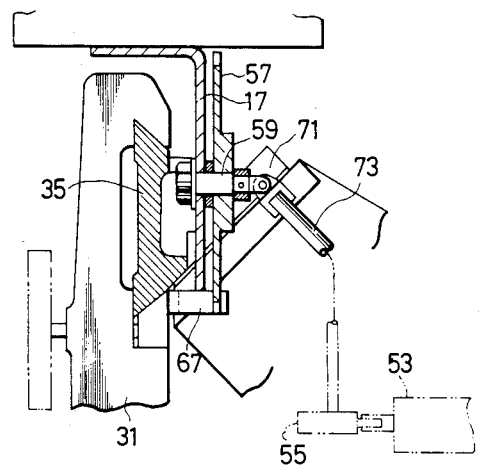
FIG. 2 is a sectional view taken along the line II—II of FIG. 1.

As is also shown in FIGS. 1 and 2, the worm gear 43 is connected at its end opposite to the driven cone pulley 45 to a plunger pump 53 which is mounted on the backside of the cutting head assembly 5. The plunger pump 53 is so designed as to variably drain the hydraulic fluid from the hydraulic motor 37 according to the rotation of the worm gear 43 to variably lower the cutting head assembly 5 from its raised position to enable the bandsaw blade 29 to cut into the workpiece W. The plunger pump 53 may be of any conventional type of variable displacement, and a suitable one for this purpose has been disclosed in U.S. Pat. No. 3,754,490. Thus, the feeding speed, at which the bandsaw blade 29 is lowered together with the cutting head assembly 5 to be fed into the workpiece W to be cut, can be controlled by controlling the drainage of the hydraulic fluid from the hydraulic motor 37 while varying the cutting speed of the bandsaw blade 29.

In order to vary the displacement of the plunger pump 53, a cam 55 is rotatably provided on the backside of the cutting head assembly 5 in contact with the plunger pump 53 as shown in FIGS. 1 and 2. The cam is so arranged as to change the stroke of the plunger of the plunger pump 53 when rotated to change or control the displacement thereof to control the drainage of the hydraulic fluid from the hydraulic motor 37. Thus, it will be understood that the feeding speed of the bandsaw blade 29 can be controlled by rotating the cam 55 to change the displacement of the plunger pump 53 to control the lowering of the cutting head assembly 5.

As shown further in FIGS. 1 and 2, in order to adjustably rotate the cam 55, a sprocket 57 having a shaft 59 and another sprocket 61 having a shaft 63 are freely rotatably provided on the backside of the beam member 17 at the opposite ends thereof. Also, an endless chain 65 is trained around the sprockets 57 and 61, and it is connected at its portion to a bracket 67 which is provided on the back of the movable guide assembly 33. The endless chain 65 is held tensioned by a tension roller 69 which is freely rotatably provided on the backside of the beam member 17. The shaft 59 of the sprocket 57 is connected by means of a universal joint 71 to a connecting shaft 73 which is connected to the cam 55 so as to rotate the cam 55 when rotated. Thus, when the movable guide assembly 33 is moved on the guide way 35 according to the size of the workpiece W to be cut, the sprocket 57 will be rotated together with the shaft 59 by the chain 65 to rotate the cam 55 through the universal joint 71 and the connecting shaft 73.

In the above described arrangement, the displacement of the plunger pump 53 will be varied or changed by the cam 55 when the movable guide assembly 33 is moved on the guide way 35 according to the size of the workpiece W to be cut to rotate the cam 55. Thus, it will be understood that the feeding speed of the bandsaw blade 29 can be automatically adjusted or controlled according to the size of the workpiece W to be cut when the movable guide assembly 33 is adjusted on the guide way 35 according thereto before starting a cutting operation.

Referring to FIG. 3, the fixed cone 49f of the driving cone pulley 49 around which the V-belt 47 is trained, is fixed onto the output shaft 51s of the electric motor 51, and it is provided with a cylindrical boss 49fb on which a key member 75 is fixed. The movable cone 49m of the driving cone pulley 49 is likewise provided with a cylindrical boss 49mb which is formed with a key groove 49mg, and it is slidably mounted on the cylindrical boss 49fb of the fixed cone 49f in a manner such that the key member 75 on the fixed cone 49f is disposed in engagement with the key groove 49mg. The arrangement is such that the movable cone 49m is kept prevented by the key member 75 from rotating on the cylindrical boss 49fb of the fixed cone 49 but it can horizontally slide thereon toward and away from the fixed cone 49f. It will be readily understood that the rotational speed of the worm gear 43 is changed when the movable cone 49m is slid on the cylindrical boss 49fb of the fixed cone 49f to move toward and away from the fixed cone 49f.

In order to move the movable cone 49m of the driving cone pulley 49 toward and away from the fixed cone 49f, a lead screw 77 is connected by a bearing means 79 to the cylindrical boss 49fb in axial alignment therewith. Also, a nut member 81 is provided in engagement with the lead screw 77 and is connected by a bearing means 83 to the cylindrical boss 49mb of the movable cone 49m in such a manner as to enable the movable cone 49m to rotate together with the fixed cone 49f to drive the V-belt 47. In order to stop the nut from rotating together with the lead screw 77, an L-shaped stopper member 85 is connected to the nut member 81 in such a manner as to extend in parallel with the lead screw 77 through a slit 87s formed through a casing 87 which is mounted on the backside of the cutting head assembly 5. Thus, when the lead screw 77 is rotated, the movable cone 49m will be moved by the lead screw 77 through the nut member 81 toward and away from the fixed cone 49f to steplessly change the rotation of the worm gear 43 and the resultant cutting speed of the bandsaw blade 29.

As shown also in FIG. 3, a sprocket 89 is fixed to the proximity of the end of the lead screw 77, and it is connected by means of a chain 91 to another sprocket 93 which is fixed to an output shaft of a motor 95 such as a servomotor which is mounted on the casing 87. Also, a detecting means 97 such as a potentiometer is connected to the extreme end of the lead screw 77 by means of a coupling means 99, and it is held by a bracket 101 which is fixed to the casing 87. The detecting means 97 is so arranged as to output voltage in proportion to the rotation of the lead screw 77 to detect the position of the movable cone 49m of the driving cone pulley 49 with regard to the fixed cone 49f. It will be readily understood that the lead screw 77 will be rotated by the motor 95 through the sprocket 93, the chain 91 and the sprocket 89 when the motor 95 is in motion.

In the above described arrangement, the movable cone 49m of the cone pulley 49 will be moved toward and away from the fixed cone 49f to steplessly control the cutting speed of the bandsaw blade 29 when the motor 95 is controlled to rotate the lead screw 77. Also, the position of the movable cone 49m toward the fixed cone 49f can be detected in proportion to the output of the detecting means 97 and therefore the cutting speed of the bandsaw blade 29 can also be detected by the detecting means 97.

Referring again to FIG. 1, the control box 19 is provided with a plurality of switches 103A, 103B, 103C and 103D for a variety of groups of natures or types of material of workpieces to be cut. Each of the switches 103A, 103B, 103C and 103D corresponds to one of groups into which workpieces to be cut of a variety of natures have been classified according to their machinability. For instance, the switch 103A corresponds to a group of easy-to-cut workpieces such as low-carbon steels and free-cutting steels, and the switch 103D corresponds to a difficult-to-cut workpieces such as stainless steels, metal alloys and heat resisting steels, and also the switches 103B and 103C correspond to medium workpieces. Thus, in cutting operations, either of the switches 103A, 103B, 103C and 103D is selected and pushed according to the machinability of the workpiece W to be out.

Figure 4:
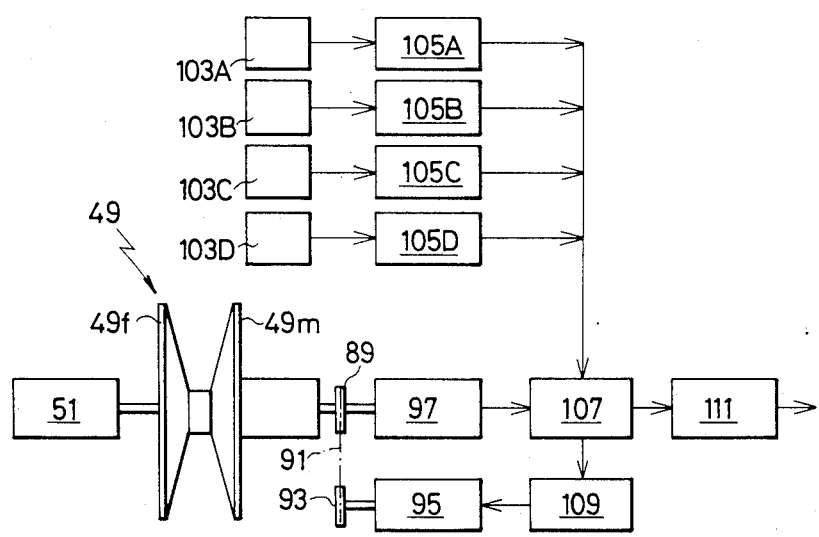
FIG. 4 is a block diagram for the horizontal bandsaw machine embodying the principles of the present invention.

Referring to FIG. 4, the switches 103A, 103B, 103C and 103D are connected to constant-voltage output means 105A, 105B, 105C and 105D, respectively, which are connected to a comparator 107 to which the detecting means 97 is connected. The comparator 107 is connected to a motor controlling circuit 109 which is connected to the motor 95, and it is also connected to a cutting controlling means 111. The comparator 107 is so arranged as to compare the output of the constant-voltage output means 105A, 105B, 105C and 105D and the output of the detecting means 97. When the outputs are not equal, the comparator 107 goes on sending output signals to the motor controlling circuit 109 to control the motor 95 until the voltages become equal. Also, when the outputs become equal, the comparator 107 sends a signal to the cutting controlling means 111 to lower the cutting head assembly 5 to enable the bandsaw blade 29 to begin a cutting cycle. In the above described arrangement, when one of the switches 103A, 103B, 103C and 103D corresponding to groups of workpieces to be cut according to the machinability is pushed, the output of the corresponding one of the constant-voltage output means 105A, 105B, 105C and 105D is compared by the comparator 107 with the output of the detecting means 97. According to the result of the comparison of the outputs, the motor 95 will act to move the movable cone 49m of the driving cone pulley 49 to obtain the optimum cutting speed of the bandsaw blade 29 for the nature or machinability of the workpiece W to be cut. Also, the comparator 107 will send an output signal to the cutting controlling means 111 to begin a cutting operation after the optimum cutting speed has been obtained to equalize the outputs of the detecting means 97 and the constant-voltage output means 105A, 105B, 105C and 105D.

As has been described in the above, an optimum cutting speed of the bandsaw blade 29 can be automatically obtained according to the present invention only by selecting and pushing one of the switches 103A, 103B, 103C and 103D which corresponds to the group of machinability into which the workpiece W to be cut is classified. Accordingly, the cutting speed of the bandsaw blade 29 can be easily determined and the cutting operations can be efficiently performed without unnecessarily shortening the life of the bandsaw blade 29.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A cutting machine, comprising:
    a cutting tool for cutting a workpiece;
    a plurality of switches, each switch corresponding to a predetermined cutting speed for each of various groups of materials having different machinability qualities; and
    a plurality of constant voltage output means, one of each of said constant voltage output means being connected with one of each of said plurality of switches for changing the speed of the cutting tool responsive to said constant voltage output means, said means including a pulley having two pulley halves that can be adjust to create varying pulley diameters.
    means for detecting the setting of the speed changing means;
    means for comparing a selected preferred cutting speed with the detected setting of the speed changing means;
    means for driving the speed changing means in response to the comparing means to set the speed changing means to the selected preferred cutting speed.

2. The cutting machine according to claim 1, further comprising means to feed the cutting tool into the workpiece at a feeding speed that is proportional to the cutting speed.

3. The cutting machine according to claim 2, further comprising means for interconnecting the feeding means to the speed changing means such that the cutting tool is fed into the workpiece at a speed proportional to the cutting speed of the cutting tool.

4. The cutting machine according to claim 3, wherein the interconnecting means comprises a cam means arranged between the speed changing means and the feeding means wherein the cam means adjusts the proportional factor between the feeding speed and the cutting speed.

5. The cutting machine according to claim 4, wherein the feeding means includes a hydraulic pump and the cam means adjusts the stroke of the pump.

6. The cutting machine according to claim 1, wherein one of the pulley halves is mounted on a rotatable lead screw.

7. The cutting machine according to claim 6, wherein the detecting means includes a potentiometer for detecting the rotational position of the lead screw.

8. The cutting machine according to claim 6, wherein the driving means comprises a motor for rotating the lead screw.

* * * * *

UNITED STATES PATENT AND TRADEMARK OFFICE
CERTIFICATE OF CORRECTION

PATENT NO. : 4,620,465

DATED : November 4, 1986

INVENTOR(S) : MASAYUKI TAGUCHI

It is certified that error appears in the above-identified patent and that said Letters Patent is hereby corrected as shown below:

IN THE SPECIFICATION:

Column 2, line 9, change "kerve" to --curve--.

IN THE CLAIMS:

Column 7, line 21, change "adjust" to --adjusted--.

Signed and Sealed this

Twenty-seventh Day of January, 1987

Attest:

DONALD J. QUIGG

*Attesting Officer*  *Commissioner of Patents and Trademarks*